United States Patent [19]
Coenen

[11] 3,833,239
[45] Sept. 3, 1974

[54] SEAT BELT

[76] Inventor: Willem Frans Coenen, Prinses Marielaan 26, Wassenaar, Netherlands

[22] Filed: Nov. 7, 1972

[21] Appl. No.: 304,345

[30] Foreign Application Priority Data
Nov. 8, 1971 Netherlands.......................... 7115345

[52] U.S. Cl............................................ 280/150 SB
[51] Int. Cl............................................ B60r 21/02
[58] Field of Search................. 280/150 SB; 180/82; 297/389

[56] References Cited
UNITED STATES PATENTS
| | | | |
|---|---|---|---|
| 3,583,726 | 6/1971 | Lindblad...................... | 280/150 SB |
| 3,680,883 | 8/1972 | Keppel......................... | 280/150 SB |
| 3,684,310 | 8/1972 | Weststrate.................... | 280/150 SB |

*Primary Examiner*—Robert R. Song
*Attorney, Agent, or Firm*—Cushman, Darby & Cushman

[57] ABSTRACT

A seat belt for a motor vehicle with automatic retraction means, so that in the stored position the belt clears the doorway.

2 Claims, 3 Drawing Figures

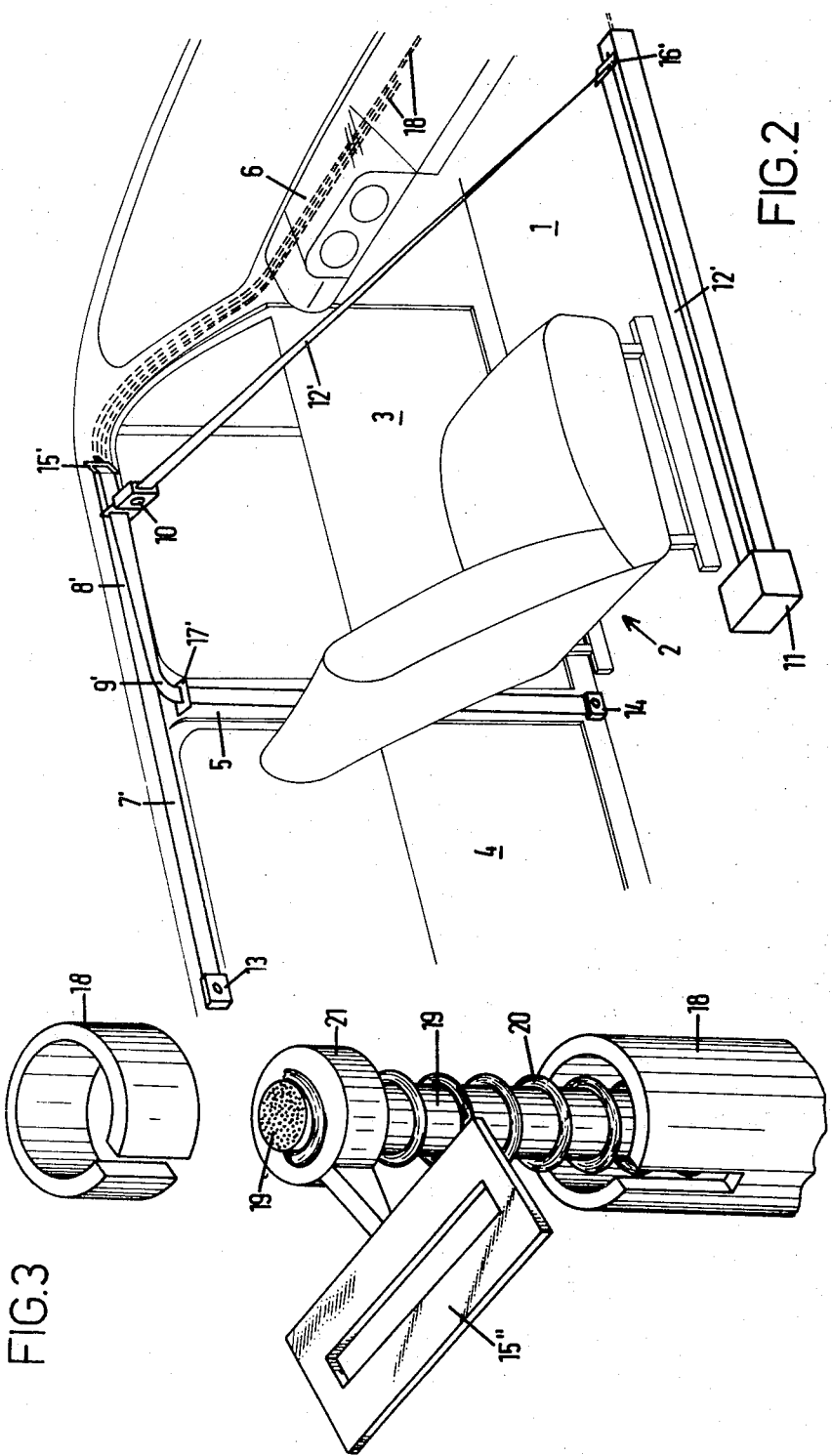

SEAT BELT

This invention relates to a safety belt for a motor vehicle, having a shoulder strap and a lap strap, which straps may constitute together a three-point belt of one single piece, the inner ends of the two straps being located on or near the longitudinal axis of the floor of the body of the motor vehicle in the operative position, the outer end of the shoulder strap being arranged near the back end of a guide at the place of the edge between the roof of the body and the adjacent sidewall extending above the door opening, and the outer end of the lap strap being located at the end of another guide on a portion of the body, elements connected with the two straps being movable along the guides.

Such a belt is known. The inner ends of the shoulder and lap straps of this safety belt, which may be embodied as a three-point-belt, are anchored to the floor of the motor vehicle body at the place of the longitudinal axis of the floor. As a consequence it is virtually impossible for an occupant to move from one seat to an adjacent seat or vice versa. Furthermore the guide for the outer end of the lap strap is arranged on the door. This severely complicates rescue operations, in particular when a motor vehicle has got into the water, and must be considered unallowable from a point of view of safety. Finally when the door is opened so as to allow people to enter or leave the vehicle the belt straps extend still partly over the relevant seat.

It is an object of the present invention to remove the above and other drawbacks. For that purpose the safety belt according to the invention is constructed in such a way that the outer end of the shoulder strap is anchored on said place and the outer end of the lap strap is secured to the bottom of the other guide extending along a post of a door opening, each strap being passed through a respective one of the elements movable along the guides, in such a way that when the shoulder strap element stops moving in forward direction and the lap strap element in upward direction, the two straps do not obstruct the doorway.

In this way a free entry and exit are obtained, since the belt straps are located outside the free surface area of the doorway.

The safety belt according to the invention can also be constructed in such a way that the extension for the two belt straps necessary for moving said elements comes from an automatic retractor located on or near the longitudinal axis of the floor and delivering one single strap which is connected to the combined inner ends of the two straps by means of a buckle. It is thus achieved that when the belt is brought into the operative position again, the extension is retracted by the automatic retractor and the belt straps drop onto the occupant in the way as desired.

It is noted that a belt construction has been described previously, in which the inner ends of some lap straps are retracted by automatic retractors after the outer or front ends of the belt straps have been interconnected with a buckle, and the strap(s) is (are) thus dropped onto the occupant(s).

One embodiment of the invention will be described, by way of example, with reference to the accompanying drawings. In said drawings:

FIG. 2 shows a corresponding elevational view, in which the safety belt is in the stored position; and FIG. 3 shows an elevational view in perspective of a cable end moving the guide loop.

Figure 1:
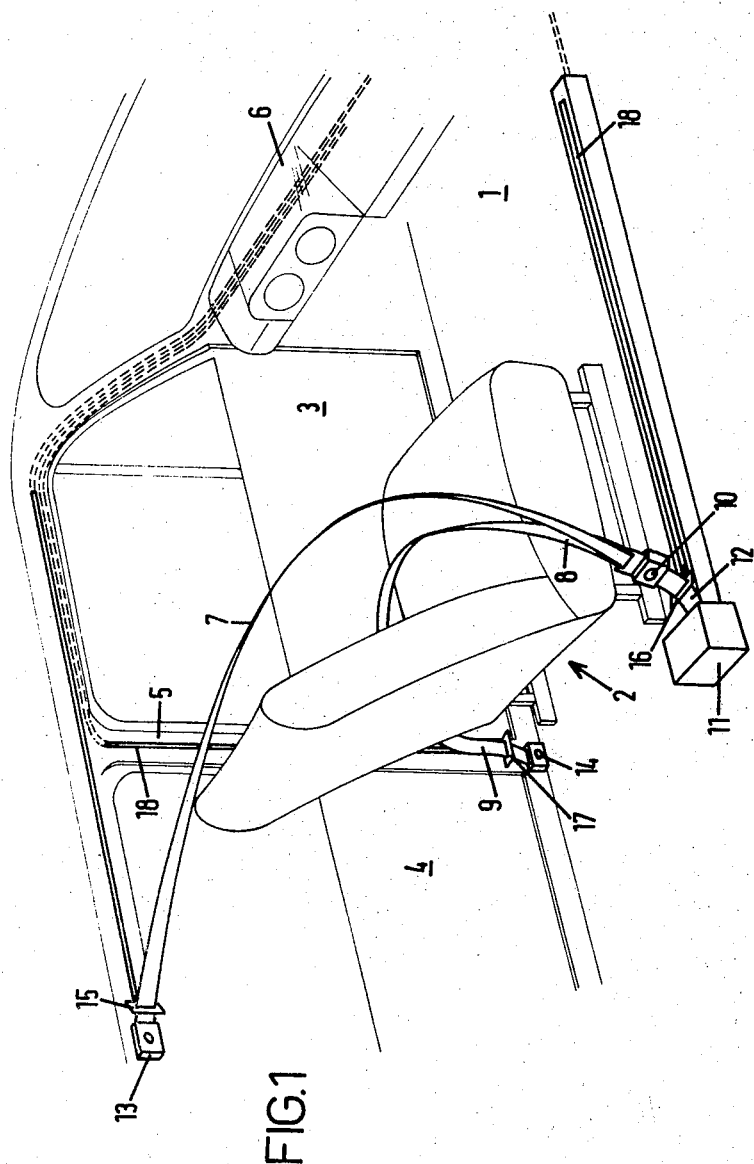
FIG. 1 shows a side elevation in perspective, from the centre of the vehicle to the sidewall, of a seat with the safety belt in the operative position, the person occupying the seat having been omitted for clearness' sake.

In the broken-open body of a motor vehicle, in this case a car, according to FIGS. 1 and 2 the floor on which a seat or a bench seat 2 has been mounted fixedly, but capable of sliding in the driving direction in the usual way is indicated by 1. A front and a rear door are indicated by 3 and 4 between which doors the so-called side post 5 is located. The dashboard is indicated by 6.

The safety belt for the person (not drawn) sitting on chair 2 comprises a shoulder strap 7 and a lap strap 8, 9 in one piece therewith. Two reference numerals have been used for the lap strap so as to distinguish between the inner lap strap 8 and the outer lap strap 9. At the place where the shoulder strap 7 and the inner lap strap 8 meet, a manually detachable buckle 10 has been provided, which is only used when the mechanically, hydraulically or electrically operating system fails to act.

At or near the centre of floor 1 and behind seat 2 a fixed automatic retractor 11 is mounted. It contains, as shown in FIG. 1, a rolled-up belt strap 12 which is shown in extended position in FIG. 2. The free end of strap 12 is connected with buckle 10. The automatic retractor locks strap 12 so that it is not extended when a shock force is exerted on it, but allows it to be gradually extended.

The ends of shoulder strap 7 and outer belt strap 9 are anchored at 13 and 14 in the usual way and places at the body and the floor respectively.

In the position shown in FIG. 1 a guide loop is located at 13 through which belt shoulder strap 7 is passed. A similar guide loop 16 is situated near automatic retractor 11, through which guide loop belt strap 12 is passed. Finally — still according to FIG. 1 — a guide loop 17 is provided near anchoring point 14 through which loop outer belt strap 9 is passed.

By means to be further described guide loops 15 and, if necessary, 16 are simultaneously drawn in forward direction into positions 15' and 16' while also simultaneously, guide loop 17 is moved upwardly via side post 5 into position 17'. If only guide loops 15 and 17 are used, means has been arranged which when said shoulder strap is drawn in forward direction urges buckle 10 to near guide loop 15' drawing the shoulder strap in forward direction.

FIG. 2 clearly shows the position obtained in this way. Shoulder strap 7 and lap straps 8, 9 are situated, partly doupled up, along the upper ledge above the doors and strap 12 has been completely drawn from the automatic retractor and extends in the first place along the floor and in the second place from guide loop 16' in inclined upward direction to near guide loop 15'. The belt straps are now indicated by 7', 8', 9' and 12'.

The safety belt in the position as shown in FIG. 2 is not in the way of people entering and leaving the vehicle.

Guide loops 15, 16 and 17 can be moved by flexible helical cables 19 guided in tubular channels 18, shown in FIG. 3 in perspective. By helical cable is understood a normally laid cable around which a helical wire 20 is grippingly wound.

The guide loops, one of which is indicated by reference numeral 15″ in FIG. 3, are secured to a nut 21 engaging with wire 20. When cable 19 is rotated by a motor (not shown), in particular an electromotor which may be arranged behind dashboard 6, nut 21 moves together with the guide loop which is fixedly or resiliently secured to the nut.

It is also possible to secure the guide loops directly to the cables and to move these in their axial directions by means of a pinion engaging with helical wire 20 and being driven by a motor.

Obviously the motor has to be reversible to move the system from the position as shown in FIG. 2 to the position as shown in FIG. 1.

It will be clear that all cables, including those of the seats in the vehicle which are not drawn, may be mutually operated by a single motor.

When an electromotor is used, its feed can be controlled via the ignition lock. When therefore the ignition key is turned to start the engine of the vehicle, the motor driving the cables is operated to move the system from the position as shown in FIG. 2 to the position as shown in FIG. 1. When the ignition key is turned back, the direction of rotation of the motor driving the cables is reversed and the system is moved from the position as shown in FIG. 1 to the position as shown in FIG. 2.

It will be clear that constructional changes can be made without departing from the scope of the invention. For instance, the fastening members of the cable ends themselves can be used to effect the necessary movements.

Resuming it can be said that a safety belt for vehicles and the like in which at least on end of one strap is connected to a retractor and other ends to the structure of the vehicle and that at least one strap length runs through an eye or loop which is attached to the vehicle structure in such a way that it can be moved by mechanical fluid or electric means or similar in directions which allow the associated strap length to be positioned in restraining contact with an occupant or away therefrom.

I claim:

1. In a safety belt system for the interior of a motor vehicle: longitudinally extending guide means mounted generally along the junction of the vehicle roof with the vehicle side wall; vertically extending second guide means mounted on said vehicle side wall; longitudinally extending third guide means mounted on an inboard portion of the vehicle floor; a safety belt having one end fixed adjacent the rear end of said first guide means and its other end fixed adjacent the lower end of said second guide means; loop-forming means intermediate the ends of said belt forming a loop in said belt whereby the portion of said belt between said one end thereof and said loop-forming means forms a shoulder strap and whereby the portion of said belt between said other end thereof and said loop-forming means forms a lap strap; a shoulder strap element movable along said first guide means, said shoulder strap passing through said shoulder strap element; a lap strap element movable along said second guide means, said lap strap passing through said lap strap element; a third element movable along said third guide means; an extension strap passing through said third element and having one end connected to said loop-forming means, the other end of said extension strap being connected to an automatically lockable retractor means which is mounted adjacent the rear end of said third guide means, the arrangement being such that when said shoulder strap element is at the forward end of said first guide means and said lap strap element is at the upper end of said second guide means, then said shoulder strap and said lap strap are clear of the vehicle door.

2. A system as in claim 1 wherein said loop-forming means is manually detachable from said third element.

* * * * *